(12) United States Patent
Gilani et al.

(10) Patent No.: US 12,215,585 B2
(45) Date of Patent: Feb. 4, 2025

(54) SYSTEM AND METHOD FOR IDENTIFYING PRODUCTIVE HEALTH OF WELLS WHILE ENSURING SAFE OPERATING CONDITIONS

(71) Applicant: SAUDI ARABIAN OIL COMPANY, Dhahran (SA)

(72) Inventors: Syed Khalid Gilani, Abqaiq (SA); Hemant Kumar Sharma, Udhailiyah (SA); Naresh Kumar Purusharthy, Udhailiyah (SA); Imran Muhammad Javed, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 141 days.

(21) Appl. No.: 17/240,256

(22) Filed: Apr. 26, 2021

(65) Prior Publication Data
US 2022/0341317 A1 Oct. 27, 2022

(51) Int. Cl.
*G06Q 10/063* (2023.01)
*E21B 49/00* (2006.01)
(Continued)

(52) U.S. Cl.
CPC ........ *E21B 49/008* (2013.01); *E21B 49/0875* (2020.05); *G06Q 10/06312* (2013.01);
(Continued)

(58) Field of Classification Search
CPC .......... G06Q 10/0633; G06Q 10/06312; E21B 49/008
See application file for complete search history.

(56) References Cited

U.S. PATENT DOCUMENTS 6,836,731 B1 12/2004 Whalley et al.
9,249,654 B2 * 2/2016 Strachan ................. E21B 44/00
(Continued)

FOREIGN PATENT DOCUMENTS

| CN | 112343576 B | * | 12/2023 | ............. E21B 47/00 |
| WO | 2018067131 A1 | | 4/2018 | |
| WO | WO-2020163040 A1 | * | 8/2020 | ............. G01V 1/288 |

OTHER PUBLICATIONS

Sigiura "A Drill Bit and a Drilling Motor With Embedded High-Frequency (1600 Hz) Drilling Dynamics Sensors Provide New Insights Into Challenging Downhole", SPE Drill & Compl 34 (03): 223-247. Paper No. SPE-194138-PA.*
(Continued)

*Primary Examiner* — Jerry O'Connor
*Assistant Examiner* — Philip N Warner
(74) *Attorney, Agent, or Firm* — Osha Bergman Watanabe & Burton LLP

(57) ABSTRACT

A method, system, and non-transitory computer readable medium storing instructions executable by a computer processor, the instructions comprising functionality for determining remediation categories for a plurality of wells include: obtaining, by a computer processor, a plurality of attributions for the plurality of wells; obtaining, by the computer processor, a set of weightages for each of the plurality of attributes for the plurality of wells; generating, by the computer processor, a first Well Health Index (WHI) set for a well among the plurality of wells; generating, by the computer processor, a second WHI set for the well; determining, by the computer processor, a sum of weightages of the second WHI set for the well; determining, by the computer processor, a remediation category among a plurality of remediation categories for the well based on the
(Continued)

sum of weightages; and generating, by the computer processor, tracking notifications and action reports for the well.

3 Claims, 12 Drawing Sheets

(51) Int. Cl.
*E21B 49/08* (2006.01)
*G06Q 10/0631* (2023.01)
*G06Q 10/0633* (2023.01)
*G06Q 10/0639* (2023.01)

(52) U.S. Cl.
CPC ... *G06Q 10/0633* (2013.01); *G06Q 10/06393* (2013.01); *E21B 2200/20* (2020.05); *E21B 2200/22* (2020.05)

(56) References Cited

U.S. PATENT DOCUMENTS

| | | | |
|---|---|---|---|
| 9,710,766 B2 | 7/2017 | Saleri et al. | |
| 9,946,986 B1 | 4/2018 | Saleri et al. | |
| 10,949,544 B2* | 3/2021 | Brannon | G06F 21/6245 |
| 11,162,331 B2* | 11/2021 | Babić | E21B 47/07 |
| 11,429,885 B1* | 8/2022 | McNair | G06N 20/00 |
| 2016/0305230 A1* | 10/2016 | Benson | E21B 47/047 |
| 2017/0046619 A1* | 2/2017 | Towailib | G06N 5/04 |
| 2017/0076158 A1* | 3/2017 | Diamond | G06K 9/6298 |
| 2017/0328187 A1* | 11/2017 | Patiñ | C10G 11/04 |
| 2019/0264545 A1* | 8/2019 | Camacho Cardenas | G05B 15/02 |
| 2019/0345810 A1* | 11/2019 | Ocegueda-Hernandez | G05B 13/042 |
| 2019/0384255 A1* | 12/2019 | Krishnaswamy | G05B 23/024 |
| 2020/0063546 A1* | 2/2020 | Weideman | E21B 7/061 |
| 2020/0103894 A1* | 4/2020 | Cella | G05B 23/0289 |
| 2020/0202047 A1* | 6/2020 | Memarzadeh | G06N 5/04 |
| 2020/0277848 A1* | 9/2020 | Johnston | E21B 44/00 |
| 2021/0004471 A1* | 1/2021 | Brannon | G06F 21/577 |
| 2021/0246766 A1* | 8/2021 | Wilson, III | G06F 3/04847 |
| 2021/0366256 A1* | 11/2021 | Michalopulos | G06V 40/10 |
| 2021/0388717 A1* | 12/2021 | Srinivasan | E21B 44/00 |
| 2022/0003108 A1* | 1/2022 | Parak | E21B 44/00 |
| 2022/0075515 A1* | 3/2022 | Floren | G06F 3/04847 |
| 2022/0128967 A1* | 4/2022 | Yepez | G05B 19/4065 |
| 2023/0419005 A1* | 12/2023 | Yu | G06F 30/28 |

OTHER PUBLICATIONS

International Search Report and Written Opinion issued in corresponding International Patent Application No. PCT/US2022/026335, mailed on Jul. 7, 2022 (12 pages).

* cited by examiner

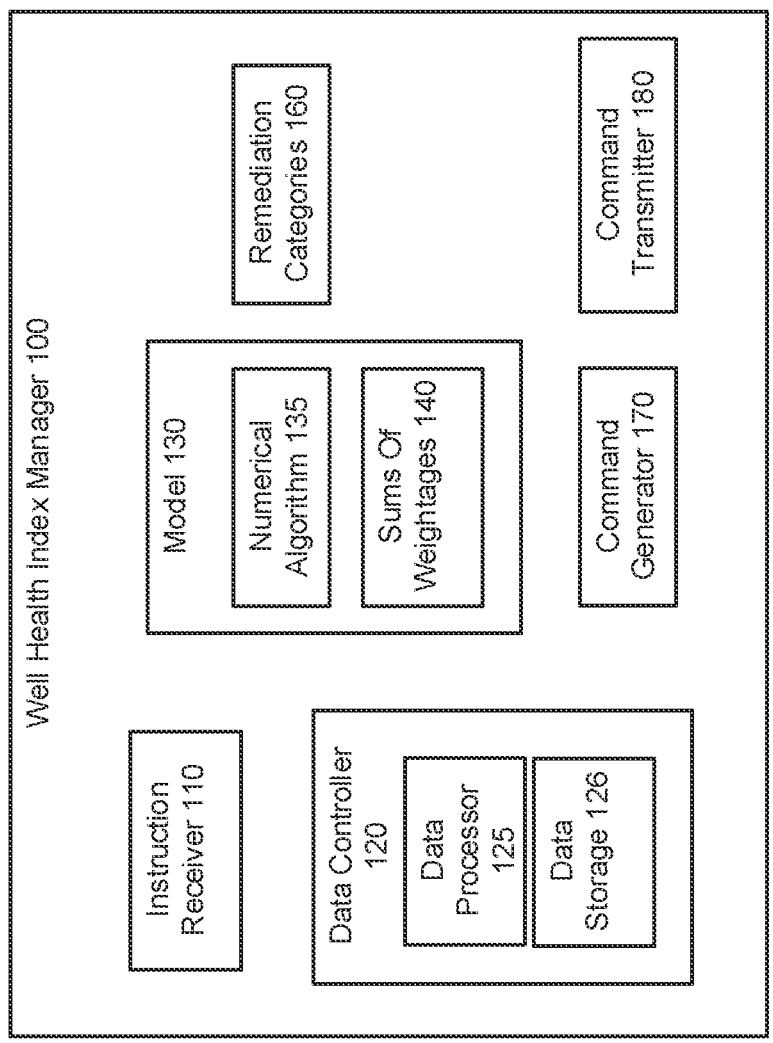
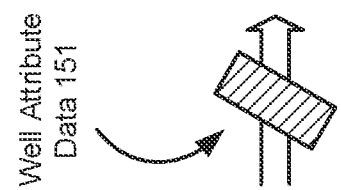
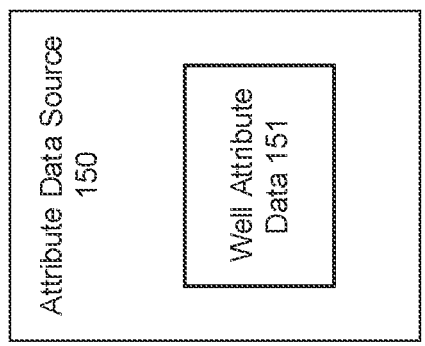
FIG. 1

| ATTRIBUTE DESCRIPTION | DEFINITION | WEIGHT | CAT | CAT DESC | AUTO CALC |
|---|---|---|---|---|---|
| Is the well NOT meeting Production/Injection Targets / NOT Rate Compliant (Requires mandatory selection of another contributing attribute)? | Is the well NOT meeting production target? Not rate compliant? Requires another attribute to be selected that would define reason for non-compliance of rate | 15 | PROD | PRODUCTIVITY | Y |
| Is the well flowing Below bubble point pressure? | Is the well flowing bottom hole pressure below the bubble point pressure of the wellbore? To be confirmed though PTA test (PI) | 80 | PROD | PRODUCTIVITY | Y |
| Is the PI/II of the well in declining trend? | Is the PTA test result confirmed decline in in PI/II? | 15 | PROD | PRODUCTIVITY | |
| Is the damaged Skin factor positive or is in increasing trend? | Is the Skin damaged factor positive or showing increasing trend? | 15 | PROD | PRODUCTIVITY | Y |
| Is the well ranked as Critical Well in WIRR? | Is the well ranked as Critical Well in WIRR? | 501 | INT | INTEGRITY | Y |
| Is the well dead well and there is NO action plan by PE? | Is the well not able to flow inspite of reviving using test trap at reduced pressure due to low reservoir pressure? | 501 | PROD | PRODUCTIVITY | Y |
| Is the well dead and a remedial action plan is in place? | Is the well not able to flow inspite of reviving using test trap at reduced pressure and damaged is foreseen due to drilling fluid/ water loading in the wellbore? | 60 | PROD | PRODUCTIVITY | Y |
| Is there commingling of flow in the reservoir (Cross Flow)? | Is there cross flow in the reservoir confirmed through production log? | 4 | PROD | PRODUCTIVITY | |
| Does the well require frequent shut-ins to flow (Cyclic well)? | Is the well flowing intermittently for some period of time and then die and after a period of build up, the well start to flow again for a short period of time? | 20 | PROD | PRODUCTIVITY | |
| Is the well under performing or closed due to ESP related issues? | Is the Well under producing or closed due to ESP related issues? | 45 | PROD | PRODUCTIVITY | Y |
| Is the flow of the well getting restricted due to high viscous fluid (TAR/Sticky material)? | Is there restriction of flow due to presence of tar/sticky materials? | 30 | PROD | PRODUCTIVITY | |
| Is there issue in the ICV Functionality with no impact on oil production? | Is there leak in the ICV control line without impacting production? | 4 | PROD | PRODUCTIVITY | |

Fig. 2A

| ATTRIBUTE DESCRIPTION | DEFINITION | WEIGHT | CAT | CAT DESC | AUTO CALC |
|---|---|---|---|---|---|
| Is the ICV functionality issue leading to reduction in oil Production? | Is there leak in the ICV control line reducing production? Is there stuck ICV reducing production? | 30 | PROD | PRODUCTIVITY | |
| Is fill accumulation impacting production? | Is well production impacted due to fill (for eg. Debris, formation sand, proppant, etc.) accumulation in the wellbore? | 45 | WB | WELLBORE ISSUES | |
| It the production restricted due to sand production? | Is there production of formation sand which is restricting production? | 15 | WB | WELLBORE ISSUES | |
| Is there restriction in production due to surface flowline restrictions? | Is there restriction due to defective choke valve/smaller size pipeline? | 20 | SURF | SURFACE / FACILITIES | |
| Is production impacted due to Tubing / Flowline scale? | Is there restriction in production due to scale build up in the tubulars? | 45 | SURF | SURFACE / FACILITIES | |
| Is there Wellbore restriction (fish, SSSV issue)? | Is wellbore restriction due to fish in the tubulars or closed/partially closed SSSV, which is impacting production? | 20 | WB | WELLBORE ISSUES | |
| Is there yearly decline in SBHP from 20-50 psi? | Is there yearly decrease in reservoir pressure from 20 to 50 psi? | 4 | PROD | PRODUCTIVITY | Y |
| Is there yearly decline in SBHP from 51-100 psi? | Is there yearly decrease in reservoir pressure from 51 to 100 psi? | 10 | PROD | PRODUCTIVITY | Y |
| Is there yearly decline in SBHP more than 100psi? | Is there yearly decrease in reservoir pressure more than 100 psi | 30 | PROD | PRODUCTIVITY | Y |
| Is the water cut between 10-30 %? | Is the well producing with water cut between 10 to 30 %? | 4 | PROD | PRODUCTIVITY | Y |
| Is the water cut between 31-70 %? | Is the wells producing with water cut between 31 to 70 %? | 10 | PROD | PRODUCTIVITY | Y |
| Is the water cut more than 70 %? | Is the wells producing with water cut more than 70 %? | 30 | PROD | PRODUCTIVITY | Y |
| Is the incremental quarterly increase in water cut from 1 to 5 %? | Is the incremental quarterly increase in water cut from 1 to 5 %? | 4 | PROD | PRODUCTIVITY | Y |
| Is the incremental quarterly increase in water cut from 6 to 10 %? | Is the incremental quarterly increase in water cut from 6 to 10 %? | 10 | PROD | PRODUCTIVITY | Y |
| Is the incremental quarterly increase in water cut more than 10 %? | Is the incremental quarterly increase in water cut more than 10 %? | 30 | PROD | PRODUCTIVITY | Y |

Fig. 2A (cont.)

| ATTRIBUTE DESCRIPTION | DEFINITION | WEIGHT | CAT | CAT DESC | AUTO CALC |
|---|---|---|---|---|---|
| Is the well NOT meeting Production/Injection Targets / NOT Rate Compliant (Requires mandatory selection of another contributing attribute)? | Is the well NOT meeting production target? Not rate compliant? Requires another attribute to be selected that would define reason for non-compliance of rate | 15 | PROD | PRODUCTIVITY | Y |
| Is the PI/II of the well in declining trend? | Is the PTA test result confirmed decline in in PI/II? | 15 | PROD | PRODUCTIVITY | |
| Is Skin factor in increasing trend? | Are trends of Skin damaged factor showing increasing trend due to which production is impacted | 15 | PROD | PRODUCTIVITY | |
| Is the well ranked as Critical Well in WIRR? | Is the well ranked as Critical Well in WIRR? | 501 | INT | INTEGRITY | Y |
| Is the well dead well and there is NO action plan by PE? | Is the well not able to flow inspite of reviving using test trap at reduced pressure due to low reservoir pressure? | 501 | PROD | PRODUCTIVITY | Y |
| Is the well dead and a remedial action plan is in place? | Is the well not able to flow inspite of reviving using test trap at reduced pressure and damaged is foreseen due to drilling fluid/ water loading in the wellbore? | 45 | PROD | PRODUCTIVITY | Y |
| Is well production restricted due to surface facility (e.g. gas plant) liquid handling limitations? | Is well production restricted due to surface facility (e.g. gas plant) liquid handling limitations? | 4 | SURF | SURFACE / FACILITIES | |
| Is well productivity effected due to liquid Loading? | Is production impacted due to liquid loading, proven by gradient surveys / PLTs, etc. | 30 | PROD | PRODUCTIVITY | |
| Does the well require frequent shut-ins to flow (Cyclic well)? | Is the well flowing intermittently for some period of time and then die and after a period of built up, the well start to flow again for a short period of time? | 20 | PROD | PRODUCTIVITY | |
| Is the well completed in multiple payzones with pressure contrast (Commingled zones - Cross Flow)? | Is there cross flow in the reservoir confirmed through production logs? | 4 | PROD | PRODUCTIVITY | |

Fig. 2B

| ATTRIBUTE DESCRIPTION | DEFINITION | WEIGHT | CAT | CAT DESC | AUTO CALC |
|---|---|---|---|---|---|
| Is fill accumulation impacting production? | Is well production impacted due to fill (for eg. Debris, formation sand, proppant etc.) accumulation in the wellbore? | 45 | WB | WELLBORE ISSUES | |
| Is the production restricted due to sand production? | Is there production of formation sand which is restricting production? | 10 | WB | WELLBORE ISSUES | |
| Is there restriction in production due to surface flowline restrictions? | Is there restriction due to defective choke valve/smaller size pipeline? | 4 | SURF | SURFACE / FACILITIES | |
| Is production impacted due to Tubing / Flowline scale? | Is there restriction in production due to scale build up in the tubulars? | 45 | SURF | SURFACE / FACILITIES | |
| Is there Wellbore restriction (fish, SSSV issue)? | Is wellbore restriction due to fish in the tubulars or closed/partially closed SSSV, which is impacting production? | 4 | WB | WELLBORE ISSUES | |
| Is the well shut-in due to tendency hydrates at choke / PCV due to high pressure drops during start ups? | Is well start-up an issue due to hydrate formation and hence is shut-in? This may require addition / change of surface setup and / or procedures | 45 | SURF | SURFACE / FACILITIES | |
| Is there a decline in SBHP? | Is SBHP trend of the well on a decline mode? | 4 | PROD | PRODUCTIVITY | |

Fig. 2B(cont.)

| ATTRIBUTE DESCRIPTION | DEFINITION | WEIGHT | CAT | CAT DESC | AUTO CALC |
|---|---|---|---|---|---|
| Is the well NOT meeting Production/Injection Targets / NOT Rate Complaint (Requires mandatory selection of another contributing attribute)? | Is the well NOT meeting production target? Not rate compliant? Requires another attribute to be selected that would define reason for non-compliance of rate | 15 | PROD | PRODUCTIVITY | Y |
| Is the PI/II of the well in declining trend? | Is the PTA test result confirmed decline in in PI/II? | 15 | PROD | PRODUCTIVITY | |
| Is the damaged Skin factor positive or is in increasing trend? | Is the Skin damaged factor positive or showing increasing trend? | 15 | PROD | PRODUCTIVITY | Y |
| Is the well ranked as Critical Well in WiRR? | Is the well ranked as Critical Well in WiRR? | 50! | INT | INTEGRITY | Y |
| Is fill accumulation impacting production? | Is well production impacted due to fill (for e.g. Debris, formation sand, proppant, etc.) accumulation in the wellbore? | 45 | WB | WELLBORE ISSUES | |
| Is there scale in Casing / Tubing / flowline which is impacting injection? | Is there restriction in injection due to scale build up in the casing/tubulars? | 45 | WB | WELLBORE ISSUES | |
| Is there restriction in production due to surface flowline restrictions? | Is there restriction due to defective choke valve/smaller size pipeline? | 4 | SURF | SURFACE / FACILITIES | |
| Is there Wellbore restriction (fish, SSSV issue)? | Is wellbore restriction due to fish in the tubulars or closed/partially closed SSSV, which is impacting production? | 20 | WB | WELLBORE ISSUES | |
| Is the yearly SBHP increasing between 20 - 50 psi? | Is there yearly increase in reservoir pressure from 20 to 50 psi? Compare Latest Approved Pressure Survey Datum Pressure With the latest approved survey from previous Year? | 4 | PROD | PRODUCTIVITY | Y |
| Is there yearly increase in SBHP from 51 - 100 psi? | Is there yearly increase in reservoir pressure from 50 to 100 psi? Compare Latest Approved Pressure Survey Datum Pressure With the latest approved survey from previous Year? | 10 | PROD | PRODUCTIVITY | Y |
| Is there yearly increase in SBHP more than 100 psi? | Is there yearly increase in reservoir pressure more than 100 psi? Compare Latest Approved Pressure Survey Datum Pressure With the latest approved survey from previous Year? | 30 | PROD | PRODUCTIVITY | Y |

Fig. 2C

| ATTRIBUTE DESCRIPTION | DEFINITION | WEIGHT | CAT | CAT DESC | AUTO CALC |
|---|---|---|---|---|---|
| Is the well NOT meeting Production/Injection Targets / NOT Rate Complaint (Requires mandatory selection of another contributing attribute)? | Is the well NOT meeting production target? Not rate compliant? Requires another attribute to be selected that would define reason for non-compliance of rate | 15 | PROD | PRODUCTIVITY | Y |
| Does the well require frequent shut-ins to flow (Cyclic well)? | Is the well flowing intermittently for some period of time and then die and after a period of build up, the well start to flow again for a short period of time? | 20 | PROD | PRODUCTIVITY | |
| Is there no flow in the well and there is action plan in place? | Is the well not able to flow inspite of using ESP? | 45 | PROD | PRODUCTIVITY | |
| Is there no flow inspite of all revival attempts by PE? | Is the well not able to flow inspite of all revival attempts using simulation and ensuring ESP is functional? | 50! | PROD | PRODUCTIVITY | Y |
| Is the well ranked as Critical Well in WIRR? | Is the well ranked as Critical Well in WIRR? | 50! | INT | INTEGRITY | Y |
| Is the well under performing or closed due to ESP related issues? | Is the well under producing or closed due to ESP related issues? | 45 | PROD | PRODUCTIVITY | Y |
| Is fill accumulation impacting production? | Is well production impacted due to fill (for e.g. Debris, formation sand, proppant, etc.) accumulation in the wellbore? | 45 | WB | WELLBORE ISSUES | |
| Is there restriction in production due to surface flowline restrictions? | Is there restriction in production due to defective choke valve/smaller size pipeline? | 20 | SURF | SURFACE / FACILITIES | |
| Is production impacted due to Tubing / Flowing scale? | Is there restriction in production due to scale build up in the tubulars? | 45 | SURF | SURFACE / FACILITIES | |
| Is there Wellbore restricion (fish, SSSV issue)? | Is wellbore restriction due to fish in the tubulars or closed/partially closed SSSV, which is impacting production? | 20 | WB | WELLBORE ISSUES | |

Fig. 2D

| ATTRIBUTE DESCRIPTION | DEFINITION | WEIGHT | CAT | CAT DESC | AUTO CALC |
|---|---|---|---|---|---|
| Is the well ranked as Critical Well in WIRR? | Is the well ranked as Critical Well in WIRR? | 501 | INT | INTEGRITY | Y |
| Is fill accumulation impacting production? | Is well production impacted due to fill (for e.g. Debris, formation sand, proppant, etc.) accumulation in the wellbore? | 45 | WB | WELLBORE ISSUES | |
| Is performing surveys effected by Wellbore restriction (fish) | Is well monitoring restricted due to fish in the tubulars or closed/partially closed SSSV, etc.? | 45 | WB | WELLBORE ISSUES | |
| Is performing surveys effected by Wellbore accessibility issues like scale, corrosion, etc. | Is well monitoring restricted due to inability to perform pressure surveys because of issues like scale or corrosion? | 45 | WB | WELLBORE ISSUES | |
| Is PDHMS malfunctioning (if applicable) | Is data from PDHMS not available due to malfunction? | 20 | | | |

Fig. 2E

SYSTEM AND METHOD FOR IDENTIFYING PRODUCTIVE HEALTH OF WELLS WHILE ENSURING SAFE OPERATING CONDITIONS

BACKGROUND

Well production problems are caused by various reasons. For example, oil, gas, water, steel, and rock are chemically non-inert under oil/gas production conditions, and may cause accumulation of solids, deterioration and corrosion of metals, and other issues within the production system due to their mutual interactions, which will result in well production impairment. Traditionally, experienced engineers identify wells with production impairment, and take proper actions in order to bring the wells back to their full potential. However, the current inspection and remediation procedures heavily dependent on engineers' experience and awareness, as well as time-consuming human labor. As a result, many of the wells end up being left unattended for years without further notices and proper remediation procedures.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for determining remediation categories for a plurality of types of wells comprising: obtaining, by a computer processor, a plurality of attributions for the plurality of wells; obtaining, by the computer processor, a set of weightages for each of the plurality of attributes for the plurality of wells; generating, by the computer processor, a first Well Health Index (WHI) set for a well among the plurality of wells; generating, by the computer processor, a second WHI set for the well; determining, by the computer processor, a sum of weightages of the second WHI set for the well; determining, by the computer processor, a remediation category among a plurality of remediation categories for the well based on the sum of weightages; and generating, by the computer processor, tracking notifications and action reports for the well.

In one aspect, embodiments disclosed herein relate to a system comprising: a plurality of attributions of a plurality of wells, and a Well Health Index (WHI) manager comprising a computer processor, wherein the WHI manager is configured to: obtaining the plurality of attributions for the plurality of wells; obtain a set of weightages for each of the plurality of attributes for the plurality of wells; generate a first Well Health Index (WHI) set for a well among the plurality of wells; generate a second WHI set for the well; determine a sum of weightages of the second WHI set for the well; determine a remediation category among a plurality of remediation categories for the well based on the sum of weightages; and generate tracking notifications and action reports for the well.

In one aspect, embodiments disclosed herein relate to a non-transitory computer readable medium storing instructions executable by a computer processor, the instructions comprising functionality for: obtaining a plurality of attributions for a plurality of wells; obtaining a set of weightages for each of the plurality of attributes for the plurality of wells; generating a first Well Health Index (WHI) set for a well among the plurality of wells; generating a second WHI set for the well; determining a sum of weightages of the second WHI set for the well; determining a remediation category among a plurality of remediation categories for the well based on the sum of weightages; and generating tracking notifications and action reports for the well.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 1 shows a system in accordance with one or more embodiments.

FIG. 2A-2E show examples of pre-defined attribute sets for oil production wells, gas production wells, water injection/disposal wells, water supply wells, and observation wells, respectively.

DETAILED DESCRIPTION

Figure 3:
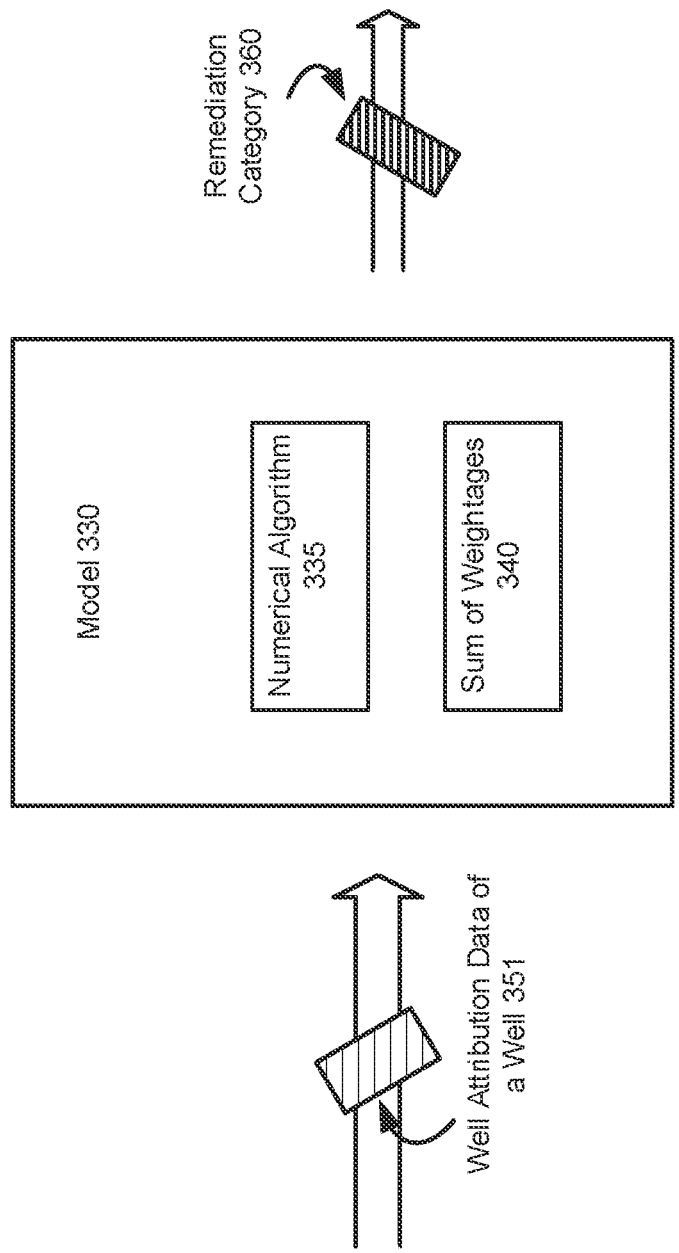
FIG. 3 shows an example in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include a system and a method for identifying productive health condition of wells while ensuring safe operations. More specifically, the present disclosure relates to a method for analyzing well health condition, evaluating well production enhancement potential, and tracking remediation procedures. In some embodiments, the method may utilize a plurality of attributes of a plurality of wells to generate a numerical model. Further, the method may utilize the model to generate a plurality of values representing health condition of the plurality of wells, and determine a remediation category for each of the plurality of wells based on the values.

Furthermore, the method may generate notifications and reports for the plurality of wells, and transmit them to users. In some embodiments, the notifications and reports may be transmitted to the users via e-mails generated by the method. Moreover, the method may include tracking procedures to ensure that proper remediation actions are taken in order to bring back full production potential of the wells. Accordingly, timely analysis of health condition of the wells and proper remediation procedures are achieved.

FIG. 1 shows a block diagram of a system in accordance with one or more embodiments. As illustrated in FIG. 1, an attribute data source (e.g., attribute data source (150)) provides various data for a Well Health Index (WHI) manager (e.g., Well Health Index Manager (100)). A data source may refer to any location where data that is being used originates or is stored. More specifically, a data source may be a database located in a disk or a remote serve, live measurements from physical devices, or a(n) file/data sheet/XML file within a computer program, etc. Types of data sources may differ according to the purposes or functions of an application. In one or more embodiments, the attribute data source (150) may be stored on a computer. The attribute data source (150) may include well attribute data (e.g., well attribute data (151)). In some embodiments, the well attribute data (151) may be collected from a plurality of wells.

In one or more embodiments, the well attribute data (151) may include various well attributes. For example, the well attributes (151) may include, well names, well types, reservoir types, historical production data, reservoir pressure data and trends, shut-in well head pressure data, productivity index and skin factors, scaling tendency, produced fluid type properties, water cut, fill accumulation, formation or fraction sand production, etc. The well attributes are not limited to the above examples. Detailed contents of the attribute data (151) will be further explained below.

Keeping with FIG. 1, the WHI manager (100) may be software and/or hardware implemented on a network, such as a network controller, and include functionality for detecting and/or managing the WHI. For example, a WHI manager may collect attribute data of various of wells, process the collected attribute data, evaluate health condition of the wells, and/or manage well remediation procedures.

In some embodiments, the WHI manager (100) may include a instruction receiver (e.g., instruction receiver (110)) that receives instructions and/or inputs from users. More specifically, the users may enter various types of instructions and/or inputs via the instruction receiver (110) to start certain actions, such as calculating, evaluating, selecting, and/or updating data or parameters.

In some embodiments, the WHI manager (100) may include a data controller (e.g., data controller (120)) that collects, processes, and stores various data obtained from the attribute data source (150). The data controller (120) may be software and/or hardware implemented on the same or different computing device as the WHI manager (100), and may include functionalities for collecting, processing, and storing the well attributes data (151) from the well attributes source (150). For example, the data controller may collect a plurality of well attribute data of a plurality wells and store the collected data in a data storage (e.g., data storage (126)) for further use and process. Further, the data controller (120) may include a data processor (e.g., data processor (125)) that sorts and processes the collected data, as well as data generated by other sections of the WHI manager (100) and data stored in the data storage (126). In other words, the data storage (126) may include not only the well attribute data (151) collected from the attribute data source (150), but also other data and parameters, such as pre-defined data correspondences, pre-defined weightages of the well attribute data (151), and/or data generated during operation of the WHI manager (100). In addition, the data processor (125) may include functionalities of generating flags for the well attributes (151) according to pre-defined conditions stored in the data storage (126). For example, the pre-defined conditions may be automatically generating flags for certain of the well attributes (151) for each type of the plurality of wells. More specifically, the last columns in FIGS. 2A-2E show examples of the well attributes (151) that are automatically flagged for each type of the plurality of wells. FIG. 2A depicts the attributes and pre-defined weightages for wells of well type oil well. FIG. 2B depicts the attributes and pre-defined weightages for wells of well type gas well. FIG. 2C depicts the attributes and pre-defined weightages for wells of well type water injection and disposal wells. FIG. 2D depicts the attributes and pre-defined weightages for wells of well type water supply well. And FIG. 2E depicts the attributes and pre-defined weightages for wells of well type observation well. Moreover, the data controller (120) may include functionalities of removing flags upon receiving certain instructions.

In some embodiments, the data storage (126) may include pre-defined correspondences between well types and well attributes. Specifically, the WHI manager may be applied to different types of wells, including oil wells, gas wells, water injection/disposal wells, water supply wells, and observation wells. Each of the well type has a pre-defined set of well attributes. That is, each well type corresponds to a particular set of well attributes that are identified by experts to classify the well types. In particular, FIGS. 2A-2E show examples of pre-defined sets of well attributes for different types of wells. Additionally, the data storage (126) may include pre-determined weights for the collected well attribute data (151). For example, FIGS. 2A-2E also show examples of the pre-determined weights for each well attributes of different types of wells.

Continuing with the data controller (120), the data controller (120) may include functionalities of automatically generating lists of pre-defined well attributes for the plurality of wells. In particular, FIGS. 2A-2E show examples of the pre-defined well attributes to be used for the automatic list generation.

Keeping with FIG. 1, the WHI manager (100) may include a model (e.g., model (130)) that utilizes one or more numerical algorithms (e.g., numerical algorithm (135)). Specifically, the model (130) may include functionality to calculate sums of weightages of a plurality of selected well attributes (e.g., sums of weightages (140)) utilizing the numerical algorithm (135). Further, the WHI manager (100) may include functionalities of determining remediation categories (e.g., remediation categories (160)) for the wells utilizing the sums of weightages (140). Detailed contents of the remediation categories (160) will be further explained below.

Specifically, the numerical algorithm may refer to one or more algorithms that use numerical approximation for analyzing mathematical problems. Some major areas of the numerical algorithm may include computing values of functions; interpolation, extrapolation, and regression; solving equations; optimization; and evaluating integrals, etc. In particular, the numerical algorithm may be realized by computing applications, such as MATLAB, and programming languages, such as R and Python.

Moreover, the WHI manager (100) may include a command generator (e.g., command generator (170)). The command generator may include functionalities of generating tracking notifications and various reports of the wells. For example, the tracking notifications may refer to notifications reminding the users that one or more wells require certain remediation actions. Further, the well reports may refer to reports notifying the users that modifications or changes are applied to the well attribute data (151) of the plurality of wells. Additionally, the well reports may reflect actions applied to the wells. For example, the actions may indicate action date, action content, organization code representing the action, planned completion date of the remediation actions, and actual completion date of the remediation actions.

Keeping with FIG. 1, the WHI manager (100) may include a command transmitter (e.g., command transmitter (180)). The command transmitter (180) may include functionalities of transmitting the notifications and reports generated by the command generator (170) to the users. For example, the command transmitter (180) may transmit the tracking notifications and action report via e-mails. In particular, the tracking notifications may be repeatedly transmitted to the users for purposes of reminding. In some embodiments, the tracking notifications may be set to be sent to the users ahead of a certain time (e.g. 10 days) before a target date of completion of the remediation actions.

In some embodiments, the attribute data source (150) and the WHI manger (100) may be implemented on the same computing device, or different computing systems connected by a network. In some embodiments, the attribute data source (150), the WHI manger (100) and/or other elements, including but not limited to network elements, user equipment, user devices, servers, and/or network storage devices may be implemented on computing systems similar to the computing system (500) shown and described in FIG. 5 below.

While FIG. 1 shows various configurations of components, other configurations may be used without departing from the scope of the disclosure. For example, various components in FIG. 1 may be combined to create a single component. As another example, the functionality performed by a single component may be performed by two or more components.

Turning to FIG. 3, FIG. 3 provides an example of utilizing a model to identify a remediation category for a well. The following example is for explanatory purposes only and not intended to limit the scope of the disclosed technology. In FIG. 3, a model (e.g., model (330)) may be one or more models utilizing numerical algorithms (e.g., numerical algorithm (335)). Similar to the description in FIG. 1, the model (330) may obtain well attribution data of a well (e.g., well attribution data of a well (351)) as inputs. In particular, the well attribution data of the well (351) may include the automatically generated lists of pre-defined well attributes for the plurality of wells as described above in FIG. 1, as well as additional well attributes selected and approved by the users. In particular, the well attributes selected and approved by the users may refer to additional well attributes that contribute to production impairment of the well. The model (330) may generate a sum of weights (e.g., sum of weightages (340)) utilizing the numerical algorithm (335). The sum of weightages represent health condition of the plurality of wells. Further, the model (330) may include functionalities of determining a remediation category (e.g., remediation category (360)) for the well as an output based on the sum of weightages (340). Detailed contents of the remediation category (360) will be described below.

Figure 4:
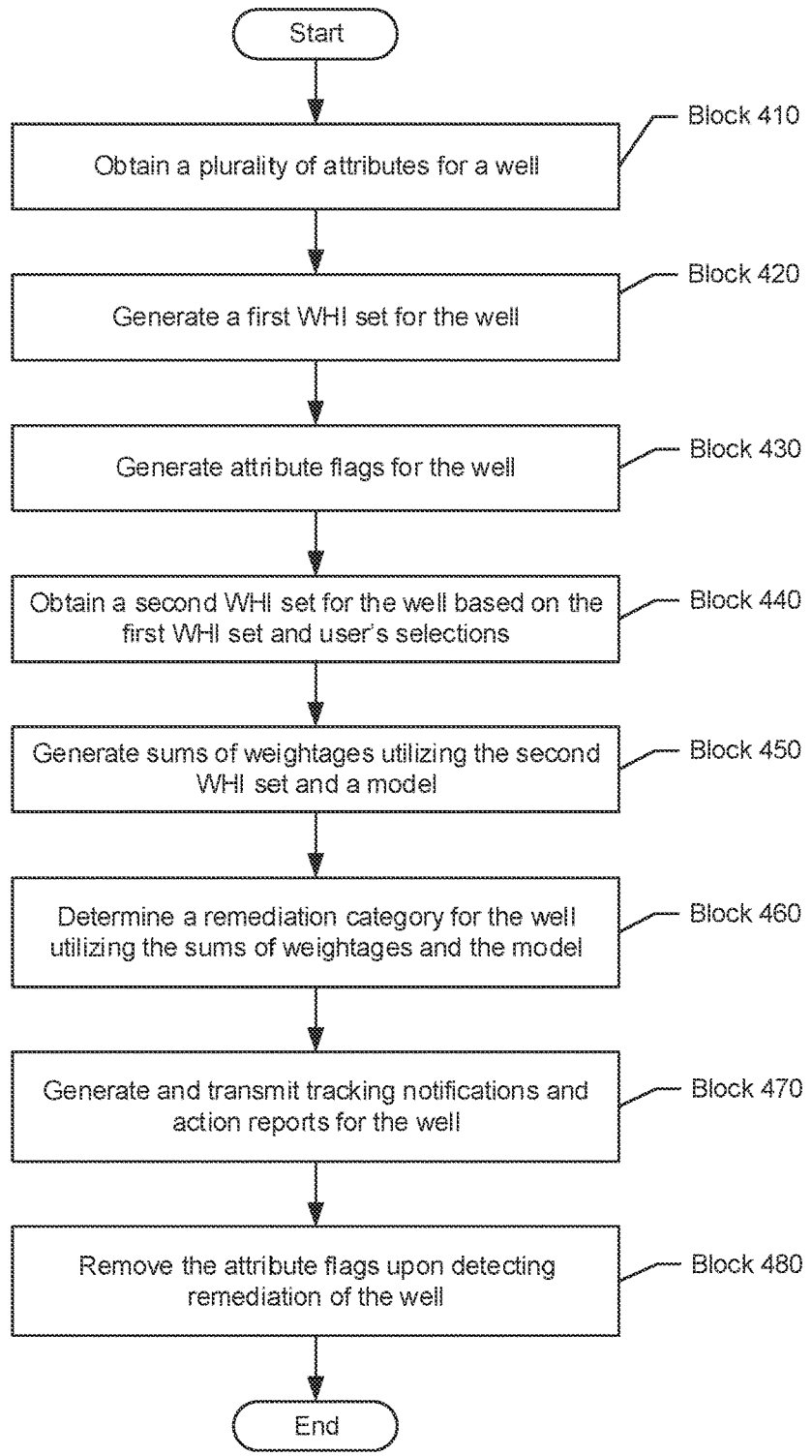
FIG. 4 shows a flowchart in accordance with one or more embodiments.

Turning to FIG. 4, FIG. 4 shows a flowchart in accordance with one or more embodiments. Specifically, FIG. 4 describes a general method for determining a remediation category for a well. One or more blocks in FIG. 4 may be performed by one or more components as described in FIG. 1, for example, the WHI manager (100). While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 410, a plurality of attributions for a well are obtained. For example, the plurality of attributions may be obtained by a data controller and include, but not limited to well names, well types, reservoir types, historical production data, reservoir pressure data and trends, shut-in well head pressure data, productivity index and skin factors, scaling tendency, produced fluid type properties, water cut, fill accumulation, formation or fraction sand production, surface facility restrictions, etc. Furthermore, FIGS. 2A-2E show examples of the plurality attributes that are required to be obtained for each type of wells.

In Block 420, a first WHI set is generated for the well. For example, the first WHI may be generated by the data controller. More specifically, the first WHI set may be generated in accordance with pre-defined correspondences between well categories and well attributes that may be stored in a data storage in the data controller.

In Block 430, attribute flags are generated for the well. For example, the attribute flags may be automatically generated in accordance with pre-defined conditions stored in the data storage in the data controller. Furthermore, the generation may be executed by the data controller.

In Block 440, a second WHI set based on the first WHI set and user's selections is obtained. For example, upon generating the first WHI set, the user reviews all the parameters in the first WHI set, and select additional well attributes that contribute to production impairment. A such, a second WHI set including the first WHI set and the additionally selected well attributes are obtained. The second WHI set may be obtained by the data controller.

In Block 450, a sum of weightages of the second WHI set is generated utilizing a model. For example, the second WHI set may be generated by the model comprising numerical algorithm, wherein the numerical algorithm calculates a sum of weightages of the second WHI set. In particular, the weightages of each well attribute are pre-defined and may be stored in the data controller. Examples of the weightages of the well attributes may be as shown in FIGS. 2A-2E. Moreover, the model may be couple to the data controller.

In Block 460, a remediation category for the well is determined utilizing the sum of the weightages and the model. For example, based on a pre-defined standard, the sum of weightage of the well represent a remediation category of the well. Specifically, one remediation category may correspond to a range of values of the sum of weightages. More details would be described in the descriptions for FIG. 5 below.

In Block 470, tracking notifications and action reports for the well are generated and transmitted to the user. For example, upon adjusting well attributes (such as water cut, reservoir pressure, etc.) and/or receiving remediation actions, tracking notifications an action reports will be sent to the user so that the changes and pending actions are reviewed and approved by the user for managements and tracking purposes.

In Block 480, the attribute flags generated in Block 430 are removed upon detecting remediation of the well. For example, upon receiving tracking notifications, the users are forced to take remediation procedures so that the well production level would be brought back to normal or the well's full potential. After the remediation procedures are done and the wells are evaluated as in good health, the previously generated attribute flags are removed. The remove may be executed by the data controller.

Those skilled in the art will appreciate that the process of FIG. 4 may be repeated for any existing wells.

Figure 5:
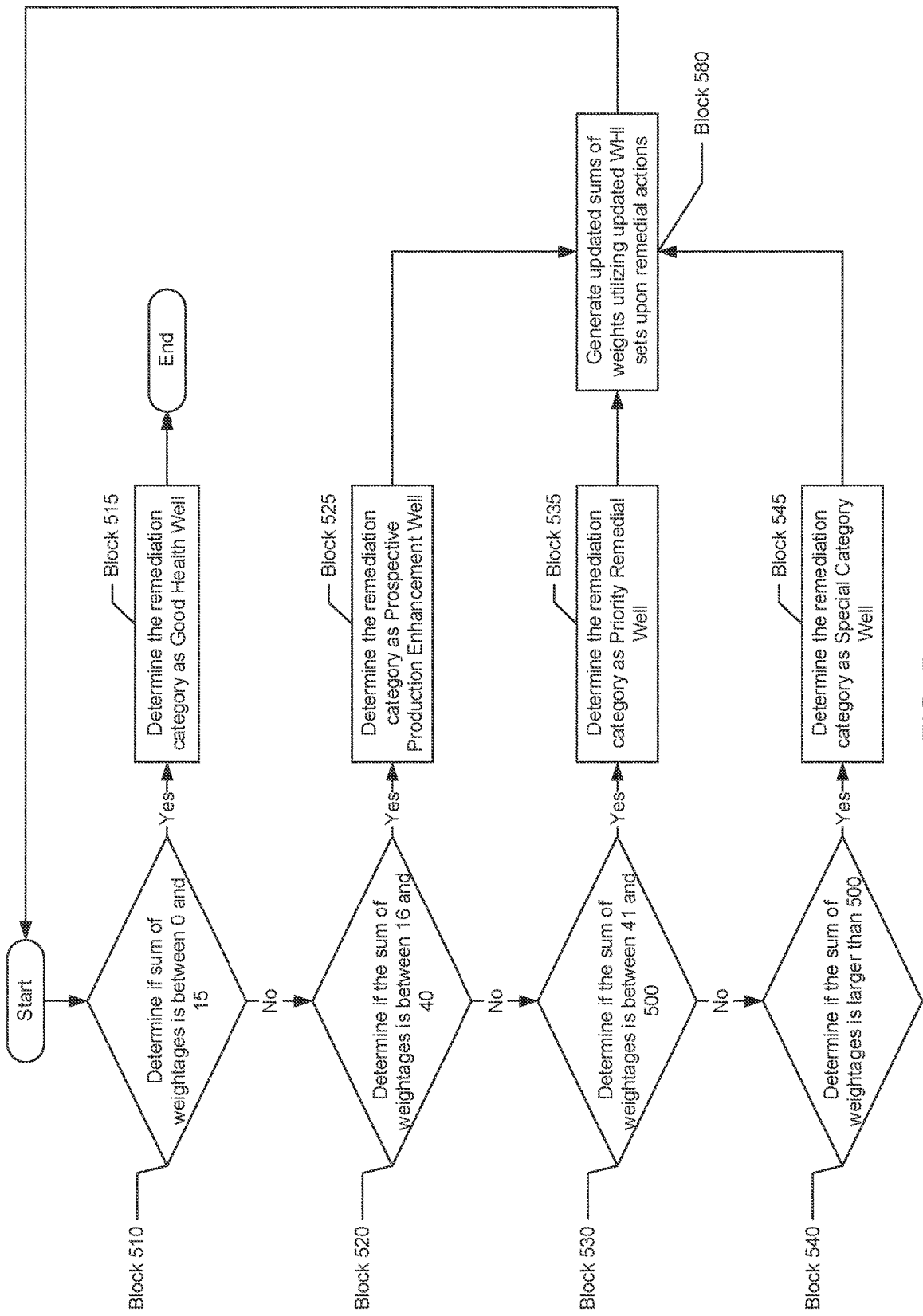
FIG. 5 shows a flowchart in accordance with one or more embodiments.

Turning to FIG. 5, FIG. 5 shows a flowchart in accordance with one or more embodiments. Specifically, FIG. 5 describes a general method for determining remediation category for a well. More specifically, FIG. 5 describes detailed procedures of Block 460 in FIG. 4. One or more blocks in FIG. 5 may be performed by one or more components as described in FIG. 1, for example, the WHI manager (100). While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 510, a determination is made whether sum of weightages is between 0 and 15. If the determination is Yes, the process proceeds to Block 515, and identify a remediation category of the well as Good Health Well, and the process ends after Block 515. If the determination is No, the process proceed to Block 520.

More specifically, the Good Health Well refers to the wells that are currently healthy without being identified issues. In particular, with annual indexing update, health condition of the Good Health Wells may change. Therefore, regular monitoring on the wells that are identified as Good Health Well are still necessary In Block 520, a determination is made whether the sum of weightages is between 16 and 40. If the determination is Yes, the process proceeds to Block 525, and identify the remediation category of the well as Prospective Production Enhancement Well. If the determination is No, the process proceeds to Block 530.

Specifically, the Prospective Production Enhancement Well refers to those wells that have some defined attributes and will need further evaluation from users (e.g., Production Engineers) including one or more of the evaluation techniques like Evaluation though various software (e.g., PipeSim, Prosper), running gauge cutter to confirm flow restriction, installed choke valve evaluation, subsurface safety valve (SSSV) functionality and restriction, reservoir pressure changes and water cut increase.

In Block 530, a determination is made whether the sum of weightages is between 41 and 500. If the determination is Yes, the process proceeds to Block 535, and identify the remediation category of the well as Priority Remedial Well. If the determination is No, the process proceeds to Block 540.

Specifically, the Priority Remedial Well refers to those wells that need immediate action from users (e.g., the Production Engineers) for production enhancement. For example, the actions for production enhancement, i.e., the remediation actions, may include one or more of the solutions such as proceeding acid stimulation, proceeding water shut-off, proceeding fill clean-out, retrieving fish in the wellbore, repairing/replacing defective choke valves, fixing electrical submersible pump (ESP) related issues, reviving dead wells, etc. In particular, production of the wells fall in this category is directly impacted by one or more well attributes. Wells under this category have the highest remediation priorities and require necessary well services work.

In Block 540, a determination is made whether the sum of weightages is larger than 500. If the determination is Yes, the process proceeds to Block 545, and identify a remediation category of the well as Special Category Well.

Specifically, the Special Category Well refer to those wells that are critical from Well Integrity Risk Ranking (WIRR), or the wells which are dead wells that may require decisions and/or actions of other entities in an organization for sidetrack, workover, abandonment, suspension, log interpretation, etc. The Special Category Well may also refer to dead wells that are on long-term waiting for reservoir pressure to increase for well self-revival.

Further, if the process proceeds to either one of Blocks 525, 535, and 545, remediation actions that would bring the well back to its full potential would be required. The process further proceeds Block 580 upon receiving proper remediation actions. Therefore, in Block 580, an updated sum of weightages is generated utilizing updated WHI sets. Afterwards, the determination process restarts with the updated sum of weightages until the well is categorized as Good Health Well.

Those skilled in the art will appreciate that the process of FIG. 5 may be repeated for any existing wells.

Figure 6:
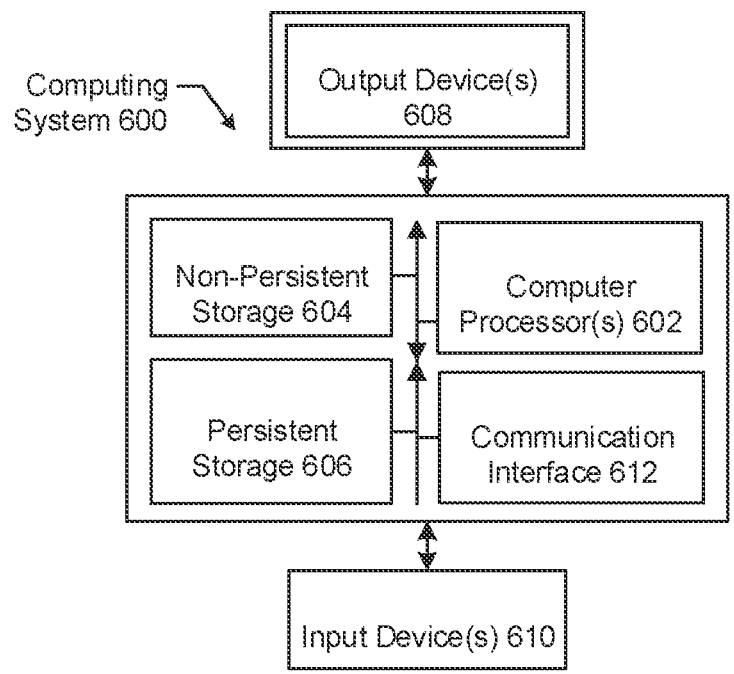
FIG. 6 shows a computer system in accordance with one or more embodiments.

Turning to FIG. 6, FIG. 6 shows a computing system in accordance with one or more embodiments. Embodiments disclosed herein may be implemented on a computing system. Any combination of mobile, desktop, server, router, switch, embedded device, or other types of hardware may be used. For example, as shown in FIG. 6, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device. In one or more embodiments, the computer processor(s) (602) and the input device(s) (610) may be included in the WHI manager (100) as described in FIG. 1 and the accompanying description.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms. In one or more embodiments, the one or more output devices (608) may be included in the WHI manager (100) in order to output the tracking notifications and action reports as described in FIG. 1 and the accompanying description.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (600) in FIG. 6 may be connected to or comprise a computer that further comprises the attribute data source (150) and the WHI manager (100) as described in FIG. 1 and the accompanying description.

The computing system of FIG. 6 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Embodiments of the present disclosure may provide at least one of the following advantages: reducing dependencies on human labor, reducing human errors, improving budgetary allocation, and improving effectiveness of drilling planning and forecasting, etc.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method comprising:
   accessing at least one sensor disposed on or proximate a first well among a plurality of wells;
   acquiring one or more live measurements from the at least one sensor, the one or more live measurements comprising a shut-in well head pressure for the first well;
   obtaining, by a network controller comprising a computer processor, attribute data for the plurality of wells, wherein the attribute data comprises the one or more live measurements and a well type, and wherein the plurality of wells are connected to the network controller over a network and comprise an oil well, a gas well, a water injection well, a water supply well, and an observation well;
   obtaining, by the network controller, a set of weightages;
   obtaining, by the network controller, a set of correspondences between a plurality of well types and a plurality of well attribute sets;
   generating, by the network controller, a first Well Health Index (WHI) set from a well attribute set for the well type of the first well according to the set of correspondences;
   automatically generating, by the network controller, attribute flags for one or more attributes in the first WHI set automatically based on the attribute data and predefined conditions for the attributes of the first WHI set;
   iteratively, until a remediation category for the first well is determined to be in good health:
      obtaining, by the network controller, a second WHI set, wherein the second WHI set is selected by a user by altering or confirming an attribute flag for each of the attributes in the first WHI set, wherein altering consists of either generating an attribute flag for an attribute without a flag or removing an attribute flag for an attribute with a flag, and wherein each attribute in the second WHI set is associated with a weight from the set of weightages;

determining, by the network controller, a sum of weightages by summing the weight of each attribute in the second WHI set;

determining, by the network controller, the remediation category among a plurality of remediation categories for the first well based on the sum of weightages, wherein each of the plurality of remediation categories correspond to a unique range of values of the sum of weightages;

determining, by the network controller, a remediation action for the first well based on the remediation category, wherein the remediation action is an acid stimulation procedure that enhances oil production at the first well;

obtaining, by the network controller, an updated attribute data for the first well in response to determining the remediation action;

updating, by the network controller, the attribute flags of the first WHI set to produce updated attribute flags automatically based on the updated attribute data; and automatically generating, by the network controller, a plurality of tracking notifications and action reports for the plurality of wells based on the updated attribute flags, wherein the plurality of tracking notifications and action reports correspond to a plurality of remediation actions for the plurality of wells, and wherein the plurality of remediation actions comprise the first remediation action; and transmitting, by the network controller and based on the updated attribute flags, the plurality of tracking notifications and action reports to at least one user device connected to the network, wherein the plurality of tracking notifications are repeatedly transmitted by the network controller to the at least one user device until the plurality of remediation actions are performed.

2. A system comprising:

a plurality of wells comprising an oil well, a gas well, a water injection well, a water supply well, and an observation well, wherein a first well is among the plurality of wells;

at least one sensor disposed on or proximate the first well; and a Well Health Index (WHI) manager comprising a network controller, wherein the WHI manager is configured to:

acquire one or more live measurements from the at least one sensor, the one or more live measurements comprising a shut-in well head pressure for the first well;

obtain attribute data for the plurality of wells, wherein the attribute data comprises the one or more live measurements and a well type, and wherein the plurality of wells are connected to the network controller over a network;

obtain a set of weightages;

obtain a set of correspondences between a plurality of well types and a plurality of well attribute sets;

generate a first Well Health Index (WHI) set for the well from a well attribute set for the well type of the first well according to the set of correspondences;

generate attribute flags for one or more attributes in the first WHI set automatically based on the attribute data and predefined conditions for the attributes of the first WHI set;

iteratively, until a remediation category for the first well is determined to be in good health:

obtain a second WHI set for the well wherein the second WHI set is selected by a user by altering or confirming an attribute flag for each of the attributes in the first WHI set, wherein altering consists of either generating an attribute flag for an attribute without a flag or removing an attribute flag for an attribute with a flag, and wherein each attribute in the second WHI set is associated with a weight from the set of weightages;

determine a sum of weightages of the second WHI set for the well by summing the weight of each attribute in the second WHI set;

determine the remediation category among a plurality of remediation categories for the first well based on the sum of weightages, wherein each of the plurality of remediation categories correspond to a unique range of values of the sum of weightages;

determine a remediation action for the first well based on the remediation category, wherein the remediation action is an acid stimulation procedure that enhances oil production at the first well;

obtain an updated attribute data for the first well in response to determining the remediation action;

update the attribute flags of the first WHI set to produce updated attribute flags automatically based on the updated attribute data;

generate a plurality of tracking notifications and action reports for the plurality of wells based on the updated attribute flags, wherein the plurality of tracking notifications and action reports correspond to a plurality of remediation actions for the plurality of wells, and wherein the plurality of remediation actions comprise the first remediation action; and transmit, based on the updated attribute flags, the plurality of tracking notifications and action reports to at least one user device connected to the network;

wherein the plurality of tracking notifications are repeatedly transmitted by the network controller to the at least one user device until the plurality of remediation actions are performed.

3. A non-transitory computer readable medium storing instructions executable by a network controller comprising a computer processor, the instructions comprising functionality for:

accessing at least one sensor disposed on or proximate a first well among a plurality of wells;

obtaining one or more live measurements from the at least one sensor, the one or more live measurements comprising a shut-in well head pressure for the first well;

obtaining attribute data for the plurality of wells, wherein the attribute data comprises the one or more live measurements and a well type, and wherein the plurality of wells are connected to the network controller over a network and comprise an oil well, a gas well, a water injection well, a water supply well, and an observation well;

obtaining a set of weightages;

obtaining a set of correspondences between a plurality of well types and a plurality of well attribute sets;

generating a first Well Health Index (WHI) set from a well attribute set for the well type of the first well according to the set of correspondences;

generating attribute flags for one or more attributes in the first WHI set automatically based on the attribute data and predefined conditions for the attributes of the well attribute set;

iteratively, until a remediation category for the first well is determined to be in good health:

obtaining a second WHI set for the well, wherein the second WHI set is selected by a user by altering or confirming an attribute flag for each of the attributes in the first WHI set, wherein altering consists of either generating an attribute flag for an attribute without a flag or removing an attribute flag for an attribute with a flag, and wherein each attribute in the second WHI set is associated with a weight from the set of weightages;

determining a sum of weightages of the second WHI set for the well by summing the weight of each attribute in the second WHI set;

determining the remediation category among a plurality of remediation categories for the well based on the sum of weightages, wherein each of the plurality of remediation categories correspond to a unique range of values of the sum of weightages;

determining a remediation action for the first well based on the remediation category, wherein the remediation action is an acid stimulation procedure that enhances oil production at the first well;

obtaining an updated attribute data for the first well in response to determining the remediation action;

updating the attribute flags of the first WHI set to produce updated attribute flags automatically based on an updated attribute data;

generating a plurality of tracking notifications and action reports for the plurality of wells based on the updated attribute flags, wherein the plurality of tracking notifications and action reports correspond to a plurality of remediation actions for the plurality of wells, and wherein the plurality of remediation actions comprise the first remediation action; and transmitting, based on the updated attribute flags, the plurality of tracking notifications and action reports to at least one user device connected to the network, wherein the plurality of tracking notifications are repeatedly transmitted by the network controller to the at least one user device until the plurality of remediation actions are performed.

\* \* \* \* \*